(12) United States Patent
Eo et al.

(10) Patent No.: US 9,975,544 B2
(45) Date of Patent: May 22, 2018

(54) APPARATUS AND METHOD FOR ACTIVE VIBRATION CONTROL OF HYBRID VEHICLE

(71) Applicant: HYUNDAI MOTOR COMPANY, Seoul (KR)

(72) Inventors: Jeong Soo Eo, Hwaseong-si (KR); Sung Jae Kim, Suwon-si (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 0 days. days.

(21) Appl. No.: 15/258,171

(22) Filed: Sep. 7, 2016

(65) Prior Publication Data
US 2017/0166187 A1    Jun. 15, 2017

(30) Foreign Application Priority Data
Dec. 10, 2015    (KR) .......................... 10-2015-0176324

(51) Int. Cl.
*B60L 9/00*        (2006.01)
*B60L 11/00*       (2006.01)
(Continued)

(52) U.S. Cl.
CPC ............. *B60W 20/17* (2016.01); *B60K 6/485* (2013.01); *B60W 10/06* (2013.01); *B60W 10/08* (2013.01);
(Continued)

(58) Field of Classification Search
CPC ...... B60W 10/06; B60W 10/08; B60W 20/15; B60W 2510/06; B60W 2510/0638;
(Continued)

(56) References Cited

U.S. PATENT DOCUMENTS 6,102,144 A * 8/2000 Lutz .................. B60K 6/48
                                              180/65.25
6,246,952 B1 * 6/2001 Honda ................ F02P 5/152
                                              123/406.38
(Continued)

FOREIGN PATENT DOCUMENTS

JP   H03-204354 A   9/1991
JP   2007-126073 A  5/2007
(Continued)

*Primary Examiner* — Harry Y Oh
(74) *Attorney, Agent, or Firm* — Brinks Gilson & Lione

(57) ABSTRACT

The present disclosure provides an apparatus and a method for active vibration control of a hybrid electric vehicle. In particular, the method may include: detecting an engine speed or a motor speed; selecting a reference angle signal based on the detected; setting up a period of a fast Fourier transform (FFT) and performing FFT of the engine speed or the motor speed for the period of the FFT from the reference angle signal; setting up a reference spectrum; extracting vibration components based on the reference spectrum; summing vibration components to be removed based on the frequencies and performing inverse FFT; determining a basic amplitude ratio based on the engine speed and an engine load and an adjustable ratio based on a SOC; and performing active vibration control of each frequency based on the the basic amplitude ratio, the adjustable ratio and the engine torque.

11 Claims, 10 Drawing Sheets

(51) Int. Cl.
  *G05D 1/00* (2006.01)
  *G05D 3/00* (2006.01)
  *G06F 7/00* (2006.01)
  *G06F 17/00* (2006.01)
  *B60W 20/17* (2016.01)
  *B60W 30/20* (2006.01)
  *B60W 40/12* (2012.01)
  *B60K 6/485* (2007.10)
  *B60W 10/06* (2006.01)
  *B60W 10/08* (2006.01)
  *B60W 20/00* (2016.01)
  *B60W 50/00* (2006.01)

(52) U.S. Cl.
  CPC ............ *B60W 20/00* (2013.01); *B60W 30/20* (2013.01); *B60W 40/12* (2013.01); *B60W 2030/206* (2013.01); *B60W 2050/0057* (2013.01); *B60W 2400/00* (2013.01); *B60W 2510/0638* (2013.01); *B60W 2510/081* (2013.01); *B60W 2510/244* (2013.01); *B60W 2710/0666* (2013.01); *B60Y 2300/20* (2013.01); *B60Y 2306/09* (2013.01); *Y02T 10/6226* (2013.01); *Y02T 10/6286* (2013.01); *Y10S 903/903* (2013.01)

(58) Field of Classification Search
  CPC ... B60W 2510/0657; B60W 2510/081; B60W 2710/0666; B60W 2710/083; B60W 30/025
  USPC .......................................................... 701/22
  See application file for complete search history.

(56) References Cited

U.S. PATENT DOCUMENTS

| | | | |
|---|---|---|---|
| 7,633,257 B2 | 12/2009 | Sakamoto et al. | |
| 9,533,672 B2* | 1/2017 | Christ | B60W 10/08 |
| 2009/0251096 A1* | 10/2009 | Schulz | H02P 6/10 |
| | | | 318/801 |
| 2009/0267555 A1* | 10/2009 | Schulz | H02P 29/50 |
| | | | 318/432 |
| 2012/0078456 A1* | 3/2012 | Hakumura | B60L 3/003 |
| | | | 701/22 |

FOREIGN PATENT DOCUMENTS

| | | |
|---|---|---|
| KR | 10-2009-0053446 A | 5/2009 |
| KR | 10-2010-0064603 A | 6/2010 |

* cited by examiner

APPARATUS AND METHOD FOR ACTIVE VIBRATION CONTROL OF HYBRID VEHICLE

CROSS-REFERENCE TO RELATED APPLICATION

This application claims priority to and the benefit of Korean Patent Application No. 10-2015-0176324, filed on Dec. 10, 2015, which is incorporated herein by reference in its entirety.

FIELD

The present disclosure relates to an apparatus and a method for active vibration control of a hybrid electric vehicle.

BACKGROUND

The statements in this section merely provide background information related to the present disclosure and may not constitute prior art.

A hybrid vehicle is a vehicle using two or more different kinds of power sources, and is generally a vehicle that is driven by an engine that obtains a driving torque by burning fuel and a motor that obtains a driving torque with battery power.

Hybrid electric vehicles can be provided with optimum output torque, depending on how the engine and the motor are operated while the vehicles are driven by the two power sources, that is, the engine and the motor.

Hybrid electric vehicles may form various structures using the engine and the motor as power sources, and hybrid electric vehicles are classified as a TMED (Transmission Mounted Electric Device) type, in which the engine and the motor are connected by an engine clutch and the motor is connected to the transmission, and an FMED (Flywheel Mounted Electric Device) type, in which the motor is directly connected to a crankshaft of the engine and connected to the transmission through a flywheel.

From among these, since the FMED type of the hybrid electric vehicle is very noisy and has severe vibration, vibration reduction thereof is being studied. A method of frequency analysis which extracts the vibration component is normally used for this.

An analog method using a band pass filter has been used in a conventional frequency analysis, and the analog method of analysis determines whether or not a frequency is abnormal based on an amplitude of each expected point of a frequency band.

However, distinguishing between the vibration component of the engine and the vibration of the noise component is difficult, and unnecessary over-control of the vibration negatively affects control efficiency and energy management. Further, because it is only possible to create and synchronize a reference signal with respect to a specific frequency in the conventional frequency analysis, comprehensive and active control of other frequencies which may be additionally generated is not performed.

SUMMARY

The present disclosure provides an apparatus and a method for active vibration control of a hybrid electric vehicle, having advantages of elaborately controlling an abnormal vibration component through an entire frequency spectrum analysis using FFT (fast Fourier transform) and reflecting a change of a surrounding frequency component in real time by feedback.

A method for active vibration control of a hybrid electric vehicle according to one form of the present disclosure may include: detecting an engine speed or a motor speed; selecting a reference angle signal based on position information of a motor or an engine; setting up a period of fast Fourier transform (FFT) and performing FFT of the engine speed or the motor speed corresponding to the period of the FFT from the reference angle signal; setting up a reference spectrum based on an engine speed and an engine load; extracting vibration components to be removed based on information of the reference spectrum; summing vibration components to be removed based on the frequencies and performing inverse FFT; determining a basic amplitude ratio based on an engine speed and an engine load and an adjustable ratio based on a SOC; and performing active vibration control of each frequency based on the information of the basic amplitude ratio, the adjustable ratio and the engine torque.

The reference angle signal may be set by dividing by a number (m) of resolver poles based on information of the position of the motor or set up the reference angle between top dead center (TDC) of the number one cylinder and bottom dead center (BDC) of the number four cylinder based on information of the position of the engine.

The FFT period may be set in consideration of a cylinder and a stroke of the engine.

The analysis of the FFT signal may calculate a magnitude and phase information of each frequency.

The frequency component that the FFT signal is greater than the reference spectrum may be selected as the vibration component to be removed.

The vibration component to be removed may be removed by outputting the motor torque corresponding to an inverse value which may be calculated by multiplying the reference signal created by inverse FFT, the engine torque, the basic amplitude ratio, and the adjustable ratio.

The adjustable ratio based on the SOC may be determined such that an antiphase torque is decreased when the SOC is low, and the antiphase torque is increased when the SOC is high.

An apparatus for active vibration control of a hybrid electric vehicle including an engine and a motor as a power source according to another form of the present disclosure may include: a position sensor configured to detect position information of the engine or the motor; and a controller configured to select a reference angle signal on the basis of a signal from the position sensor, perform fast Fourier transform (FFT) of engine speed or motor speed, extract a vibration component to be removed through the FFT analysis, and generates a reference signal by performing inverse FFT, and performs active vibration control of each frequency by reflecting the reference signal, a basic amplitude ratio based on an engine speed and an engine load, an adjustable ratio based on a SOC (state of charge), and an engine torque.

The controller may set up a reference spectrum based on an engine speed and an engine load, and extract the vibration component to be removed by comparing the reference spectrum with the FFT signal.

The controller may sum the vibration components to be removed based on frequencies, and generate a reference signal by performing inverse FFT.

The controller may remove the vibration component by outputting the motor torque corresponding to an inverse value. The inverse value can be obtained by multiplying the reference signal created by inverse FFT, the engine torque, the basic amplitude ratio, and the adjustable ratio.

The controller may set up the reference angle signal by dividing by a number (m) of resolver poles based on information of the position of the motor or sets up the reference angle signal between top dead center (TDC) of a number one cylinder and bottom dead center (BDC) of a number four cylinder based on information of the position of the engine.

The controller may set up an FFT period in consideration of a cylinder and stroke of the engine, and analyzes the FFT signal by a calculated magnitude and phase information of each frequency.

As described above, the vibration may be actively controlled because the exact vibration component of each frequency may be extracted through FFT frequency spectrum analysis. Therefore, since the determination system of the reference angle of the engine and the motor may be utilized as it is, an additional device or an algorithm for signal synchronization as used in the conventional art may be eliminated.

In addition, the adjustment amounts of vibration and a frequency which is an object of the vibration control may be controlled individually, so it is possible to avoid inefficiency which is from the control when the vibration is over-removed and the fuel consumption may be improved as the motor torque is increased when the engine is accelerated. Particularly, it is possible to constantly maintain the SOC of the battery within the predetermined range by using the adjustable ratio.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

Figure 1:
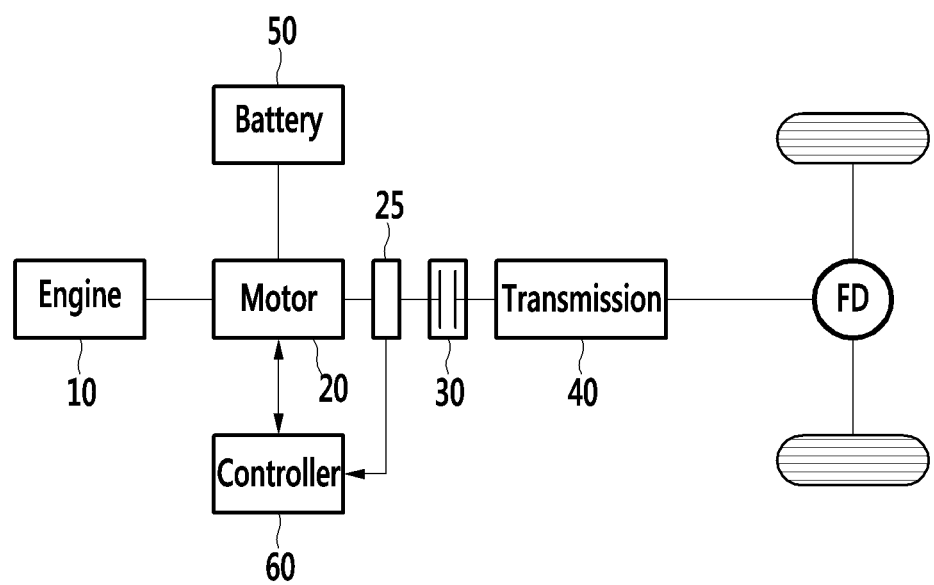
FIG. 1 is a schematic diagram of an apparatus for active vibration control of a hybrid electric vehicle.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

As those skilled in the art would realize, the described forms may be modified in various different ways, all without departing from the spirit or scope of the present disclosure.

Throughout this specification and the claims which follow, unless explicitly described to the contrary, the word "comprise" and variations such as "comprises" or "comprising" will be understood to imply the inclusion of stated elements but not the exclusion of any other elements.

It is understood that the term "vehicle" or "vehicular" or other similar term as used herein is inclusive of motor vehicles in general including hybrid vehicles, plug-in hybrid electric vehicles, and other alternative fuel vehicles (e.g., fuels derived from resources other than petroleum). As referred to herein, a hybrid electric vehicle is a vehicle that has two or more sources of power, for example both gasoline-powered and electric-powered vehicles.

Additionally, it is understood that some of the methods may be executed by at least one controller. The term "controller" refers to a hardware device that includes a memory and a processor configured to execute one or more steps that should be interpreted as its algorithmic structure. The memory is configured to store algorithmic steps and the processor is specifically configured to execute said algorithmic steps to perform one or more processes which are described further below.

Furthermore, the control logic of the present disclosure may be embodied as non-transitory computer readable media on a computer readable medium containing executable program instructions executed by a processor, a controller, or the like. Examples of computer readable media include, but are not limited to, ROM, RAM, compact disc (CD)-ROMs, magnetic tapes, floppy disks, flash drives, smart cards, and optical data storage devices. The computer readable recording medium can also be distributed in network coupled computer systems so that the computer readable media are stored and executed in a distributed fashion, e.g., by a telematics server or a controller area network (CAN).

FIG. 1 is a schematic block diagram of an apparatus for active vibration control of a hybrid electric vehicle according to one form of the present disclosure.

As shown in FIG. 1, an apparatus for active vibration control of a hybrid electric vehicle includes an engine 10, a motor 20, a position sensor 25, a clutch 30, a transmission 40, a battery 50, and a controller 60.

The engine 10 outputs driving power by burning fuel as a power source while turned on. The engine 10 may be various engines such as a gasoline engine or a diesel engine using conventional fossil fuel. The rotation power generated from the engine 10 is transmitted to the transmission 40 through the clutch 30.

The motor 20 is operated by a 3-phase AC voltage applied from the battery 50 through an inverter to generate torque, and operates as a power generator and supplies regenerative energy to the battery 50 in a coast-down mode.

In one form, the motor 20 may be directly connected to the crankshaft of the engine 10.

The position sensor 25 acquires position information of the engine 10 or the motor 20. The position information of the engine 10 or the motor 20 are transmitted to the controller 60. The position sensor 25 may include a crankshaft position sensor that detects a phase of the crankshaft or a motor position sensor that detects a position of a stator and a rotor of the motor. The controller 60 may calculate an engine speed by differentiating the rotation angle detected by the crankshaft position sensor, and a motor speed may be calculated by differentiating the position of the stator and the rotor of the motor detected by the motor position sensor. The position sensor 25 may be a speed sensor (not shown) for measuring the engine speed or the motor speed.

The clutch 30 is disposed between the motor 20 connected to the crankshaft of the engine 10 and the transmission 40, and switches power delivery to the transmission 40. The clutch 30 may be applied as a hydraulic pressure type of clutch or dry-type clutch.

The transmission 40 adjusts a shift ratio based on a vehicle speed and a running condition, distributes an output torque based on the shift ratio, and transfers the output torque to the driving wheel, thereby enabling the vehicle to run. The transmission 40 may be an automatic transmission (AMT) or a dual clutch transmission (DCT).

The battery 50 is formed with a plurality of unit cells, and a high voltage for providing a driving voltage to the motor 20 is stored at the battery 50. The battery 50 supplies the driving voltage to the motor 20 depending on the driving mode, and is charged by the voltage generated from the motor 20 in the regenerative braking.

The controller 60 selects a reference angle signal on the basis of a signal from the position sensor, performs fast Fourier transform (FFT), extracts a vibration component to be removed via the FFT analysis, and performs active vibration control of each frequency by performing inverse FFT. The reference signal may mean an inverse FFT signal of the vibration components to be removed based on frequencies.

After that, the controller 60 performs an active vibration control of each frequency by reflecting the reference signal, a basic amplitude ratio based on an engine speed and an engine load, an adjustable ratio based on a SOC (state of charge), and an engine torque.

For these purposes, the controller 60 may be implemented as at least one processor that is operated by a predetermined program, and the predetermined program may be programmed in order to perform each step of a method for active vibration control of a hybrid electric vehicle.

Various forms described herein may be implemented within a recording medium that may be read by a computer or a similar device by using software, hardware, or a combination thereof, for example.

According to hardware implementation, the forms described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, and electric units designed to perform any other functions.

According to software implementation, forms such as procedures and functions described in the present forms may be implemented by separate software modules. Each of the software modules may perform one or more functions and operations described in the present disclosure. A software code may be implemented by a software application written in an appropriate program language.

Hereinafter, a method for active vibration control of the hybrid electric vehicle according to one form of the present disclosure will be described in detail with reference to FIG. 2 to FIG. 6.

Figure 2:
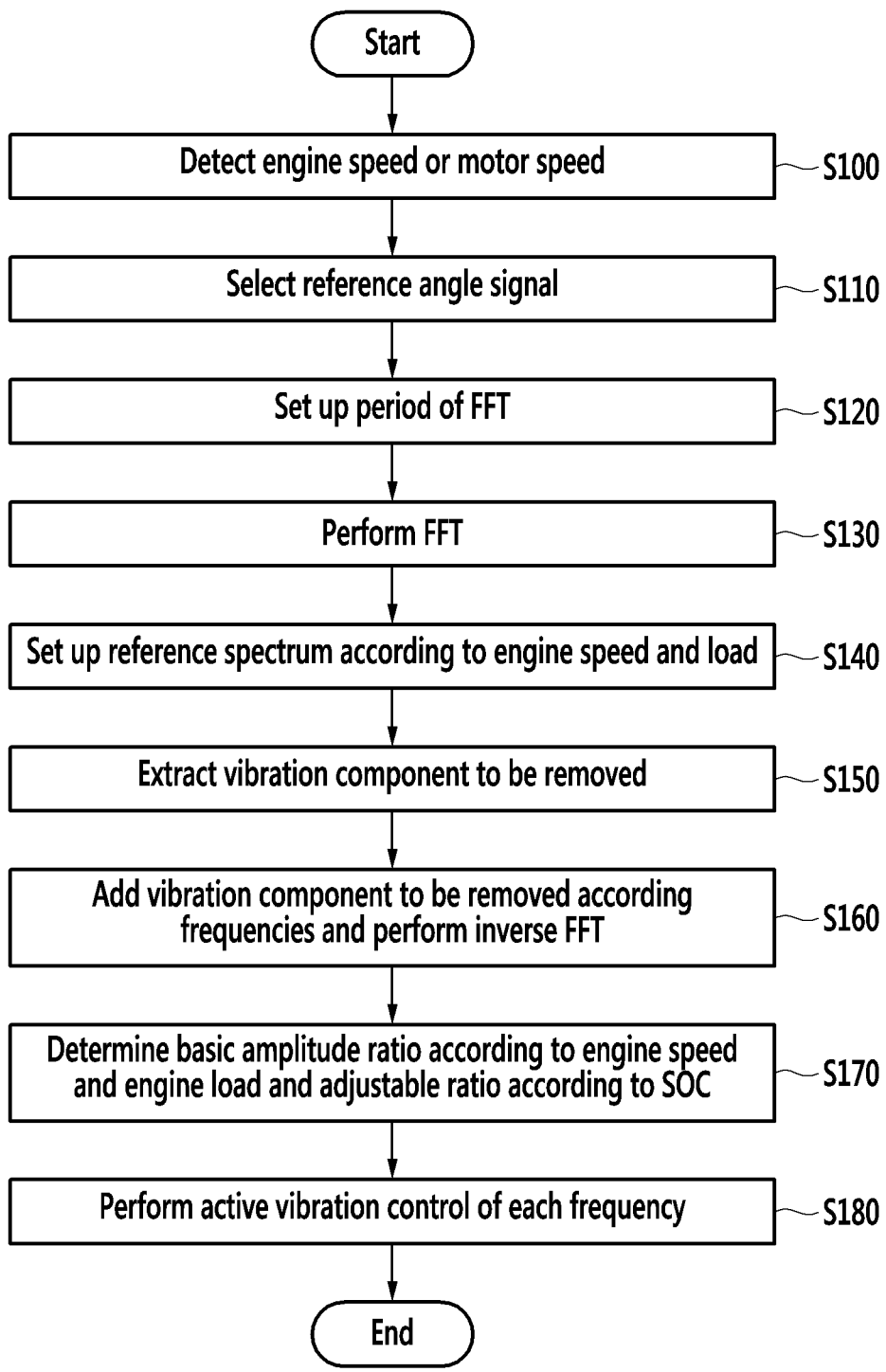
FIG. 2 is a flowchart illustrating a method for active vibration control of a hybrid electric vehicle.

FIG. 2 is a flowchart illustrating a method for active vibration control of a hybrid electric vehicle.

Figure 3:
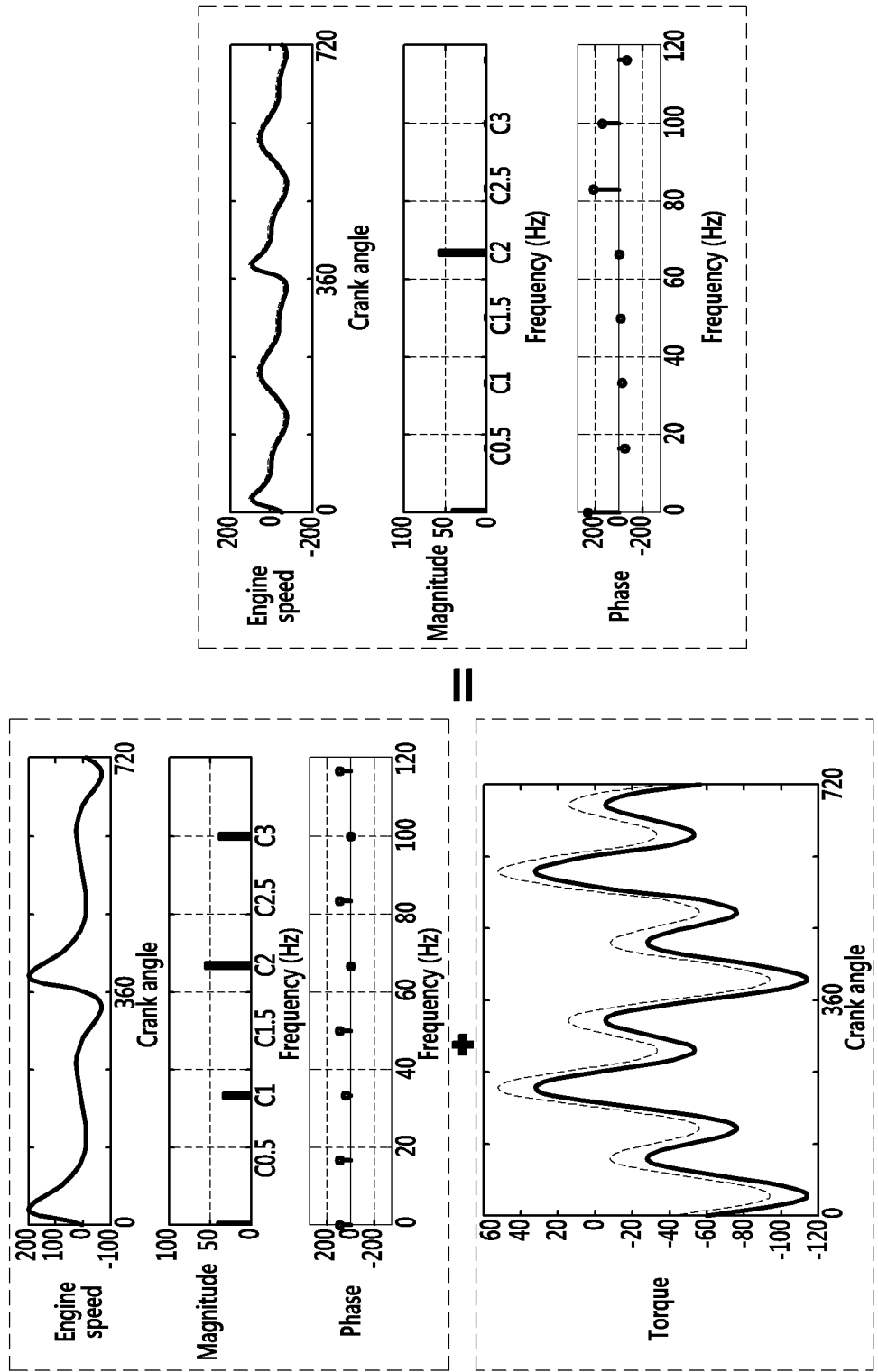
FIG. 3 is a drawing illustrating vibration reduction to which a method for active vibration control of a hybrid electric vehicle is applied when a SOC of a battery is low.
Figure 4:
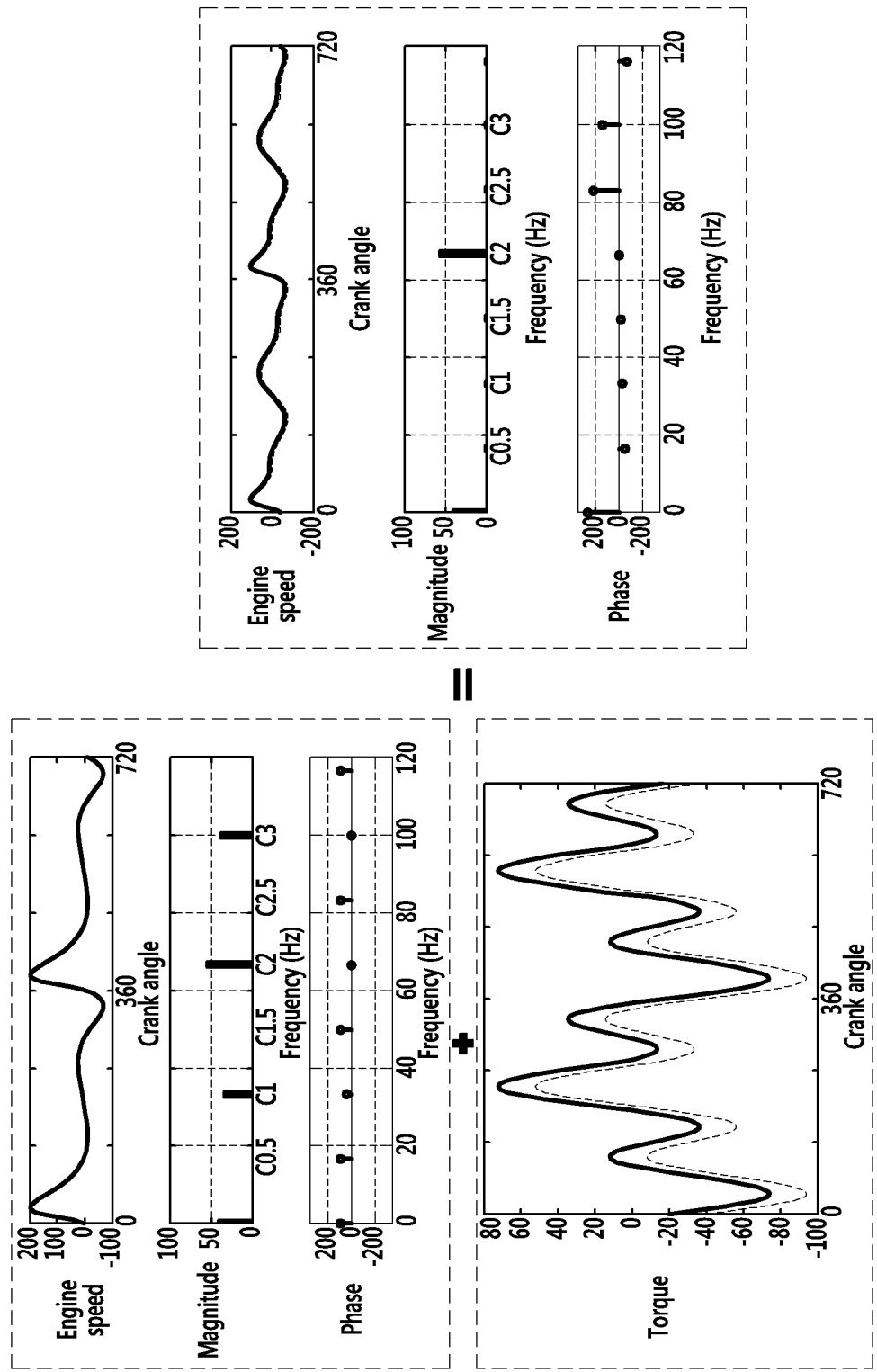
FIG. 4 is a drawing illustrating vibration reduction to which a method for active vibration control of a hybrid electric vehicle is applied when a SOC of a battery is high.

FIG. 3 is a drawing illustrating vibration reduction to which a method for active vibration control of a hybrid electric vehicle is applied when a SOC of a battery low. FIG. 4 is a drawing illustrating vibration reduction to which a method for active vibration control of a hybrid electric vehicle is applied when a SOC of a battery high. FIG. 5A to 5F are graphs for explaining a method for active vibration control of a hybrid electric vehicle.

Figure 5A:
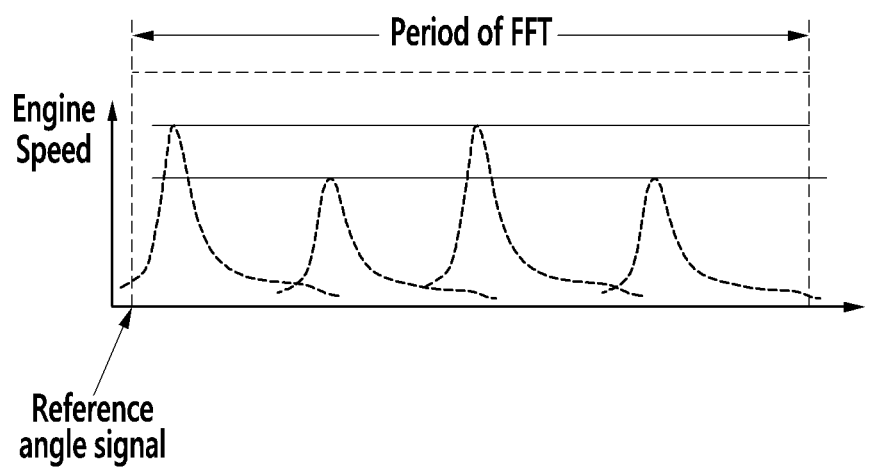
FIG. 5A to 5F are graphs for explaining a method for active vibration control of a hybrid electric vehicle.

As shown in FIG. 2, an active vibration control method of the hybrid electric vehicle is started when the position sensor 25 obtains position information of the engine 10 or the motor 20 at step S100, and the controller 60 may acquire engine speed or motor speed using the position information of the engine 10 or the motor 20 at step S100 (refer to FIG. 5A).

The controller 60 selects the reference angle signal based on the signal of the position sensor 25 at step S120. That is, the controller 60 selects the reference angle signal according to information of positions of the engine 10 and the motor 30 (refer to FIG. 5A).

The controller 60 may set up the reference angle signal by dividing a number (m) of resolver poles based on information of the position of the motor 20, or may set up the reference angle signal between top dead center (TDC) and bottom dead center (BDC) of the number one cylinder or the number four cylinder based on information of the position of the engine 10. For example, the controller 60 may select the reference angle signal based on the information of the position of the motor 20, and may create the reference angle signal by dividing 16 poles signal into eight (8). The reference angle signal means a start point for performing FFT.

After that, the controller 60 sets up a period of the FFT for performing the FFT at step S120. The controller 60 may set up the entire period in consideration of a number of cylinders and stroke of the engine 10. For example, if the engine 10 has four cylinders and four strokes, the crank angle may be 720 degrees.

When the FFT period is set up in the step S120, the controller 60 performs the FFT at step S130. That is, the controller 60 performs the FFT of the engine speed or the motor speed corresponding to the period of the FFT from the reference angle signal (refer to FIG. 5B). The controller 60 may calculate magnitude and phase information of each frequency by analyzing the FFT signal.

Figure 5B:
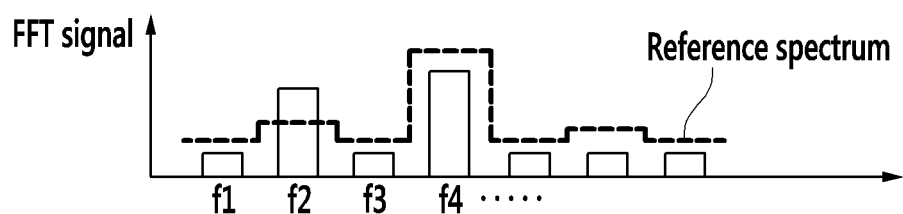
Figure 5C:
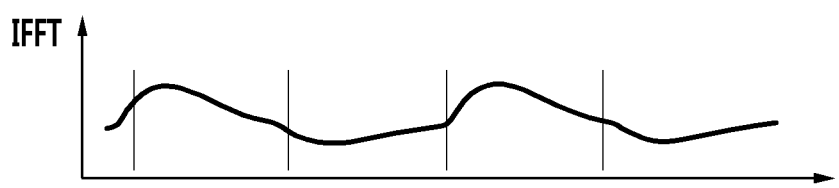
Figure 5D:
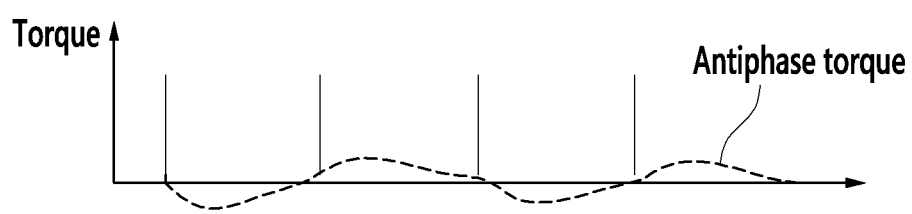

In addition, the controller 60 sets up a reference spectrum according to the engine speed and load at step S140 (refer to FIG. 5B). That is, the controller 60 may set up a vibration reference value of each frequency according to an operating point of the engine.

When the reference spectrum is set up in the step S140, the controller 60 extracts a vibration component to be removed at step by comparing the FFT signal with the reference spectrum at step S150. That is, the controller 60 may select an object requiring vibration control in a compared result value of the FFT analysis and the predetermined vibration reference value. The controller 60 may extract the frequency component of which the FFT signal is greater than the reference spectrum as the vibration component to be removed.

Since the reference spectrum means normal vibration components according to the engine speed and load, the controller 60 determines the frequency component of which the FFT signal is greater than the reference spectrum as abnormal vibration components to be removed. For example, referring to FIG. 4B, f2 frequency component may be selected as a frequency component to be removed.

Referring to FIG. 3 and FIG. 4, a magnitude and a phase of vibration components of each frequency calculated by performing FFT analysis is illustrated in left upper side of the drawing.

When the vibration components to be removed is selected in the step S150, the controller 60 sums the vibration components to be removed according to frequencies, and performs inverse FFT to create a reference signal at step S160 (refer to FIG. 4C). As described above, the reference signal means inverse FFT signal of the vibration components to be removed.

The controller 60 determines a basic amplitude ratio according to an engine speed and an engine load, and an adjustable ratio according to the SOC (state of charge) at step S170. The amplitude ratio according to the engine speed and the engine load may be determined in advance by a predetermined map. The adjustable ratio according to the SOC may be determined such that an antiphase torque is decreased when the SOC is low, and the antiphase torque is increased when the SOC is high.

Referring to FIG. 3 and FIG. 4, an antiphase torque values which overlap the component of vibration to be removed as indicated is illustrated in left lower side of the drawing (refer to dotted line). As shown in solid line of FIG. 3, the adjustable ratio may be determined such that the antiphase torque is decreased in order to charge the battery when the SOC is low.

On the contrary, as shown in solid line of FIG. 4, the adjustable ratio may be determined such that the antiphase torque is increased in order to discharge the battery when the SOC is high.

After that, controller 60 performs active vibration control of each frequency based on the basic amplitude ratio, the adjustable ratio, and the engine torque at step S180. That is, the controller 60 may remove all the positive components and negative components of the vibration components by outputting the motor torque (antiphase torque) corresponding to an inverse value which is calculated by multiplying the reference signal created by inverse FFT, the engine torque, the adjustable ratio and the basic amplitude ratio (refer to FIG. 5D).

Referring to FIG. 3 and FIG. 4, the antiphase torque is applied to the vibration components of each frequency as described in left side are reflected, thereby it can be controlled such that the vibration component to be removed is removed and a desired vibration component remains as described in right side of the drawings.

Figure 5E:
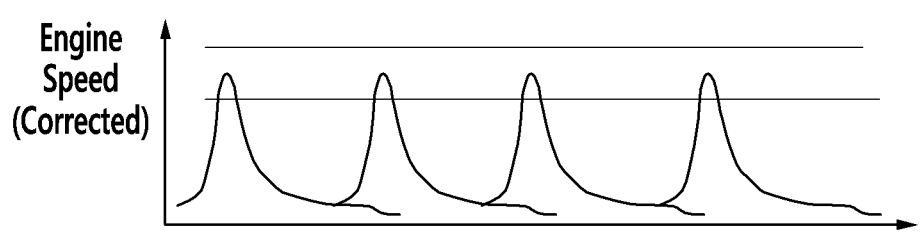
Figure 5F:
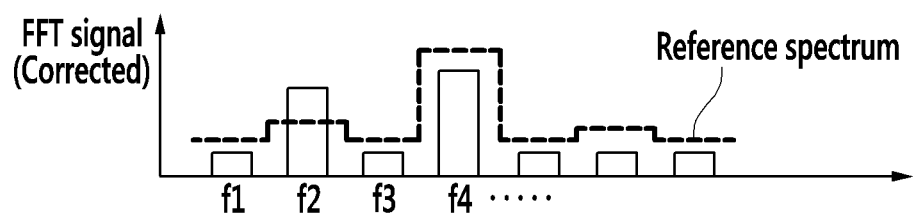

In order words, since the reference signal is expressed as speed according to time, the controller 60 removes the vibration components to be removed by reflecting the engine torque and the basic amplitude ratio to the reference signal and transforming the reference signal to torque component. That is, as shown in FIGS. 5E and 5F, it is possible to control the engine speed or the motor speed that the frequency components corresponding to the reference spectrum are remained.

In order to manage the SOC of the battery, charging amount or discharging amount of the battery should be controlled when the vibration component is controlled. That is, it needs to maintain the SOC of the battery within a predetermined range by performing the active vibration control and the battery control (i.e., charge depleting control or charge sustaining control) simultaneously. Therefore, when the adjustable ratio according to the SOC is applied, it is possible to constantly maintain final torque as the SOC of the battery constantly maintains within the predetermined range.

As described above, the vibration may be actively controlled because the exact vibration component of each frequency may be extracted through FFT frequency spectrum analysis. Therefore, since the determination system of the reference angle of the engine and the motor may be utilized as it is, an additional device or an algorithm for signal synchronization as used in the conventional art may be eliminated.

In addition, the adjustment amounts of vibration and a frequency which is an object of the vibration control may be controlled individually, so it is possible to reduce or avoid inefficiency which is from the control when the vibration is over-removed and the fuel consumption may be improved as the motor torque is increased when the engine is accelerated. Particularly, it is possible to constantly maintain the SOC of the battery within the predetermined range by using the adjustable ratio.

While this present disclosure has been described in connection with what is presently considered to be practical exemplary forms, it is to be understood that the present disclosure is not limited to the disclosed forms. On the contrary, it is intended to cover various modifications and equivalent arrangements included within the spirit and scope of the present disclosure.

What is claimed is:

1. A method for active vibration control of a hybrid electric vehicle, the method comprising:
   detecting, by a sensor, an engine speed or a motor speed;
   selecting, by a controller, a reference angle signal based on position information of a motor or an engine;
   setting, by the controller, a period for applying a fast Fourier transform (FFT) based on a number of cylinders of an engine and a stroke of the engine;
   determining, using the controller, a FFT signal based on performing the FFT on the engine speed or the motor speed during the period, the FFT signal comprised of a plurality of frequency components;
   determining, by the controller, a reference spectrum covering the plurality of frequency components based on the engine speed and an engine load of the engine;
   extracting, from the FFT signal by the controller, vibration components to be removed by comparing the FFT signal with the reference spectrum for each of the plurality of frequency components;
   determining a summed removal object by summing, by the controller, each of the extracted vibration components;
   determining a reference signal based on performing an inverse FFT on the summed removal object;
   determining, by the controller, a basic amplitude ratio based on the engine speed and the engine load, and determining an adjustable ratio based on a state of charge (SOC); and
   performing, by the controller, active vibration control on each of the plurality of frequency components by summing values calculated from the basic amplitude ratio, the adjustable ratio, an engine torque, and the reference signal.

2. The method of claim 1, wherein the reference angle signal is set by dividing a number of resolver poles based on information of the position of the motor or set up between a top dead center (TDC) and a bottom dead center (BDC) of a number one cylinder or a number four cylinder based on the position information of the engine.

3. The method of claim 1, further comprising calculating, by the controller, a magnitude and phase of each of the plurality of frequency components by analyzing the FFT signal.

4. The method of claim 1, wherein the extracted vibration components are removed by applying a motor torque corresponding to an inverse value calculated by multiplying the reference signal obtained from performing the inverse FFT, the engine torque, the basic amplitude ratio, and the adjustable ratio.

5. The method of claim 1, wherein
the adjustable ratio is determined based on the SOC such that an antiphase torque is decreased when the SOC is low, and the antiphase torque is increased when the SOC is high.

6. An apparatus for active vibration control of a hybrid electric vehicle including an engine and a motor as a power source, the apparatus comprising:
a position sensor configured to acquire position information of the engine or the motor; and
a controller configured to:
select a reference angle signal based on the position information from the position sensor;
determine a fast Fourier transform (FFT) signal based on performing the FFT on an engine speed or a motor speed during a period determined based on a number of cylinders of an engine and a stroke of the engine so as to apply the FFT, the FFT signal comprised of a plurality of frequency components;
extract, from the FFT signal, vibration components to be removed; and
generate a reference signal by performing an inverse FFT on each of the extracted vibration components,
wherein the controller is configured to perform active vibration control on each of the plurality of frequency components by summing values calculated from the reference signal, a basic amplitude ratio determined based on the engine speed and an engine load, an adjustable ratio determined based on a state of charge (SOC), and an engine torque.

7. The apparatus of claim 6, wherein the controller is configured to determine a reference spectrum covering the plurality of frequency components based on the engine speed and the engine load of the engine, and extract the vibration components by comparing the FFT signal with the reference spectrum for each of the plurality of frequency components.

8. The apparatus of claim 6, wherein the controller is configured to remove the extracted vibration components by applying a motor torque corresponding to an inverse value which is calculated by multiplying the reference signal obtained from performing the inverse FFT, the engine torque, the basic amplitude ratio, and the adjustable ratio.

9. The apparatus of claim 6, wherein the controller is configured to set up the reference angle signal by dividing a number of resolver poles based on the position information of the motor or set up the reference angle signal between a top dead center (TDC) and a bottom dead center (BDC) of a number one cylinder or a number four cylinder based on the position information of the engine.

10. The apparatus of claim 6, wherein the controller is configured to to analyze signals processed by the FFT based on a calculated magnitude and phase of each of the plurality of frequency components.

11. The apparatus of claim 6, wherein
the controller is configured to determine the adjustable ratio such that an antiphase torque is decreased when the SOC is low, and the antiphase torque is increased when the SOC is high.

* * * * *